United States Patent
Kennedy, III et al.

(10) Patent No.: US 7,208,562 B2
(45) Date of Patent: Apr. 24, 2007

(54) REACTION INJECTION MATERIAL FOR A GOLF BALL

(75) Inventors: Thomas J. Kennedy, III, Wilbraham, MA (US); David M. Melanson, Northampton, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 11/276,041

(22) Filed: Feb. 10, 2006

(65) Prior Publication Data

US 2006/0094538 A1    May 4, 2006

(51) Int. Cl.
*A63B 37/12*    (2006.01)
*A63B 37/00*    (2006.01)

(52) U.S. Cl. .......................... 528/64; 528/76; 473/373; 473/374; 473/378

(58) Field of Classification Search ...................... None
See application file for complete search history.

(56) References Cited

U.S. PATENT DOCUMENTS

| | | |
|---|---|---|
| 5,356,941 A | 10/1994 | Sullivan et al. |
| 6,287,217 B1 | 9/2001 | Sullivan et al. |
| 6,290,614 B1 | 9/2001 | Kennedy, III et al. |
| 6,309,313 B1 | 10/2001 | Peter |
| 6,533,566 B2 | 3/2003 | Tzivanis et al. |
| 6,645,088 B2 | 11/2003 | Wu et al. |
| 6,663,508 B1 | 12/2003 | Keller et al. |
| 6,685,579 B2 | 2/2004 | Sullivan |
| 6,716,954 B2 | 4/2004 | Keller et al. |
| 6,755,634 B2 | 6/2004 | Tzivanis et al. |
| 6,787,091 B2 | 9/2004 | Dalton et al. |
| 2002/0016435 A1 | 2/2002 | Simonutti et al. |
| 2005/0049082 A1* | 3/2005 | Tzivanis et al. ............ 473/378 |

* cited by examiner

*Primary Examiner*—David J. Buttner
(74) *Attorney, Agent, or Firm*—Michael A. Catania; Elaine H. Lo

(57) ABSTRACT

A golf ball having a layer composed of a polyurethane/polyurea material formed from reaction injection molding a polyol component and an isocyanate component. The polyol component preferably comprises a polytetramethylene ether glycol having a molecular weight of approximately 1000 and a 3,5-diethyl-2,4 toluenediamine. The layer is preferably a cover layer having a thickness ranging from 0.010 inch to 0.025 inch.

13 Claims, 1 Drawing Sheet

REACTION INJECTION MATERIAL FOR A GOLF BALL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to reaction injection material for a golf ball. More specifically, the present invention relates to a reaction injection polyurethane/polyurea material for a golf ball.

2. Description of the Related Art

Reaction injection molding ("RIM") is a process used to make golf ball components, such as one-piece balls, covers, cores, and inner layers. Highly reactive liquids are injected into a closed mold, mixed usually by impingement and/or mechanical mixing in an in-line device such as a "peanut mixer", and polymerized primarily in the mold to form a coherent, molded article. When used to make a thermoset polyurethane or polyurea or polyurethane/polyurea component, RIM usually involves a rapid reaction between two types of reactants: (a) a polyol or other material with an active hydrogen, such as a polyfunctional alcohol or amine (hereinafter referred to as "polyol" or "POLY"); and (b) an isocyanate-containing compound (hereinafter referred to as "isocyanate" or "ISO"). The reactants are stored in separate tanks prior to molding and may be first mixed in a mix-head upstream of a mold and then injected into the mold. The liquid streams are metered in the desired weight to weight ratio and fed into an impingement mix-head, with mixing occurring under high pressure, e.g., 1500 to 3000 pounds per square inch ("psi"). The liquid streams impinge upon each other in the mixing chamber of the mix-head and the mixture is injected into the mold. One of the liquid streams typically contains a catalyst for the reaction. The reactants react rapidly after mixing to gel and form polyurethane or polyurea or polyurethane/polyurea polymers.

RIM offers several advantages over conventional, injection and compression molding techniques for producing golf products and/or equipment. For example, in the RIM process, the reactants are simultaneously mixed and injected into the mold, forming the desired component. In conventional techniques, the reactants must first be mixed in a mixer separate from the molding apparatus, then added into the apparatus. In such a process, the mixed reactants first solidify and must later be melted in order to properly mold the desired components, etc.

Additionally, the RIM process requires lower temperatures and pressures during molding than injection or compression molding. Under the RIM process, the molding temperature is maintained from about 90 to about 180° F., and usually at about 100–160° F., in order to ensure proper injection viscosity. Compression molding is typically completed at a higher molding temperature of about 320° F. (160° C.) while injection molding is completed at an even higher temperature range of 392–482° F. (200–250° C.). Molding at a lower temperature is beneficial when, for example, the cover is molded over a very soft core so that the very soft core does not melt or decompose during the molding process.

Moreover, the RIM process creates more favorable durability properties in a golf ball component than conventional techniques. For example, a golf ball cover produced by a RIM process has a uniform or "seamless" cover in which the properties of the cover material in the region along the parting line are generally the same as the properties of the cover material at other locations on the cover, including at the poles. The improvement in durability is due to the fact that the reaction mixture is distributed uniformly into a closed mold. This uniform distribution of the injected materials reduces or eliminates knit-lines and other molding deficiencies which can be caused by temperature differences and/or reaction differences in the injected materials. The RIM process results in generally uniform molecular structure, density and stress distribution as compared to conventional injection molding processes, where failure along the parting line or seam of the mold can occur because the interfacial region is intrinsically different from the remainder of the cover layer and, thus, can be weaker or more stressed.

Furthermore, the RIM process is relatively faster than conventional techniques. In the RIM process, the chemical reaction usually takes place in under 5 minutes, typically in less than two minutes, sometimes in under one minute and, in many cases, in about 30 seconds or less. The demolding time may be 10 minutes or less, typically 5 minutes or less and, in many cases, 2 minutes or less. The molding process for the conventional methods itself typically takes about 15 minutes. Thus, the overall speed of the RIM process makes it advantageous over the injection and compression molding methods.

Furthermore, the RIM process allows for low pressure when injecting the components into the mold. Regular injection molding of a thermoplastic occurs at between 1500 psi and 3000 psi. RIM molding may be accomplished at less than 1000 psi.

Several patents disclose the use of RIM utilized for golf balls. One of the earliest disclosures of RIM is U.S. Pat. No. 5,356,941 to Sullivan et al., for Game Balls having Improved Core Compositions, which discloses the use of RIM.

Further discloses are set forth in U.S. Pat. No. 6,803,119 to Sullivan et al., for a Multi-Layer Golf Ball, and U.S. Pat. No. 6,287,217 to Sullivan et al., for Multi-Layer Golf Ball, both which disclose the use of a BAYFLEX RIM polyurethane as a cover for a golf ball.

A further disclosure is set forth in U.S. Pat. No. 6,290,614 to Kennedy III et al., for a Golf Ball Which Includes Fast-Chemical-Reaction-Produced Component And Method Of Making Same, which discloses a RIM process in which the temperature is 90–180° F., and the pressure is 200 pounds per square inch ("psi") or less, and the processing time is 10 minutes or less, and preferably 30 second or less. This patent further discloses that the mix head pressure is between 1500 to 3000 psi.

A further disclosure is set forth in U.S. Pat. No. 6,533,566 to Tzivanis et al., for an Apparatus For Making A Golf Ball, which discloses a turbulence inducing mold for a RIM process.

A further disclosure is set forth in U.S. Pat. No. 6,290,614 to Kennedy III et al., for a Multi-Layer Golf Ball, which discloses a RIM system utilized for a cover of a golf ball.

Another disclosure is U.S. Pat. No. 6,309,313 to Peter, for a Low Cost, Resilient, Shear Resistant Polyurethane Elastomers For Golf Ball Covers, which discloses using RIM at temperatures of 120–250° F.

Yet a further disclosure is set forth in U.S. Pat. No. 6,663,508 to Keller et al., for Multi-Layer Golf Ball With Reaction Injection Molded Polyurethane Component, which discloses the use of a BAYFLEX MP-10,000 RIM system which operates at 10–5 mmHg at 77° F. and has a molecular weight of 600–700.

Yet a further disclosure is set forth in U.S. Pat. No. 6,685,579 to Sullivan, for Multi-Layer Cover Polyurethane Golf Bal, which discloses the use of a RIM with a material having a viscosity up to 2000 cPs and pressures of 2000 to 2500 psi.

Yet a further disclosure is set forth in U.S. Pat. No. 6,716,954 to Keller et al., for a Golf Ball Formed From A Polyisocyanate Copolymer And Method Of Making Same, which discloses the use of DESMODUR HL material which has a NCO content of 10–11%.

A further disclosure is set forth in U.S. Pat. No. 6,755,634 to Tzivanis et al., for an Apparatus For Forming A Golf Ball With Deep Dimples, which discloses an apparatus capable of using RIM at temperatures of 50–250° F., pressures of 100 psi or less, and an impingement pressure of 150–195 bars.

A further disclosure is set forth in U.S. Pat. No. 6,787,091 to Dalton et al., for a Reaction Injection And Compression Molding Of A Golf Ball, which discloses a reaction injection compression molding RCIM process which operates at an impingement head pressure of 1000 to 5000 psi.

Another disclosure is U.S. Patent Publication Number 2002/0016435 to Simonutti et al., for a Method OF Making A Golf Ball Product From Fast-Curing Reaction Injection Molded Polyurethane, which discloses a RIM process with an isocyanate temperature of 100–130° F., a polyol temperature of 100–130° F., a raw material tank pressure of 40–80 psi, an isocyanate pressure of 1000–3000 psi, polyol pressure of 1000–3000, mold temperature of 130–200° F., and an inject time of less ten seconds.

BRIEF SUMMARY OF THE INVENTION

The present invention is a novel reaction injection molded polyurethane composition for a golf ball. The polyurethane composition is utilized for any layer of a golf ball, including a core, a boundary layer or a cover. The polyurethane composition is preferably utilized as a cover material for a golf ball.

One aspect of the present invention is a golf ball having a core and a cover layer. The cover layer is formed from reaction injection molding a polyol component and an isocyanate component. The polyol component includes a polytetramethylene ether glycol and a 3,5-diethyl-2,4 toluenediamine. The isocyanate component includes a quasi-polyurethane prepolymer which includes a methylene-4,4'-diphenyldiisocyanate and a glycol. The cover layer has a Shore B hardness greater than 30 as measured on a golf ball and a material Shore D hardness of greater than 10 as measured on a plaque or slab.

Another aspect of the present invention is a golf ball having a layer composed of a polyurethane/polyurea material. The polyurethane/polyurea material is formed from reaction injection molding a polyol component and an isocyanate component. The polyol component includes a polytetramethylene ether glycol and a 3,5-diethyl-2,4 toluenediamine. The isocyanate component includes a quasi-polyurethane prepolymer comprising methylene-4,4'-diphenyldiisocyanate and a glycol. The poly component comprises 55 to 70 weight percent of the polyurethane/polyurea material and the isocyanate component comprises 30 to 45 weight percent of the polyurethane/polyurea material. The layer is selected from the group consisting of core, boundary layer and cover layer.

Yet another aspect of the present invention is a golf ball having a layer composed of a polyurethane/polyurea material. The polyurethane/polyurea material is formed from reaction injection molding a polyol component and an isocyanate component. The polyol component includes a first polytetramethylene ether glycol having a molecular weight of approximately 1000, a second polytetramethylene ether glycol having a molecular weight of approximately 2000 and a 3,5-diethyl-2,4 toluenediamine. The isocyanate component includes a quasi-polyurethane prepolymer comprising methylene-4,4'-diphenyldiisocyanate and a glycol. The layer is selected from the group consisting of core, boundary layer and cover layer.

Yet another aspect of the present invention is a golf ball having a layer composed of a polyurethane/polyurea material. The polyurethane/polyurea material is formed from reaction injection molding a polyol component and an isocyanate component. The polyol component includes a polytetramethylene ether glycol having a molecular weight of approximately 1000 and a 3,5-diethyl-2,4 toluenediamine. The isocyanate component includes a quasi-polyurethane prepolymer comprising methylene-4,4'-diphenyldiisocyanate and a glycol. The layer is selected from the group consisting of core, boundary layer and cover layer.

Yet another aspect of the present invention is a golf ball including a core, a boundary layer and a cover layer disposed over the boundary layer. The cover layer includes a polyurethane/polyurea material. The polyurethane/polyurea material is formed from reaction injection molding a polyol component and an isocyanate component. The polyol component includes a first polytetramethylene ether glycol having a molecular weight of approximately 1000, a second polytetramethylene ether glycol having a molecular weight of approximately 2000 and a 3,5-diethyl-2,4 toluenediamine. The first polytetramethylene ether glycol comprises 55 to 60 weight percent of the poly component, the second polytetramethylene ether glycol comprises 15 to 20 weight percent of the poly component, and the 3,5-diethyl-2,4 toluenediamine comprises 15 to 20 weight percent of the poly component. The cover layer has a thickness ranging from 0.010 inch to 0.025 inch and a Shore B hardness greater than 30 as measured on a golf ball and a material Shore D hardness of greater than 10 as measured on a plaque or slab.

Yet another aspect of the present invention is a golf ball which includes a core, a boundary layer and a cover layer disposed over the boundary layer. The cover layer is composed of a polyurethane/polyurea material. The polyurethane/polyurea material is formed from reaction injection molding a polyol component and an isocyanate component. The polyol component includes a polytetramethylene ether glycol having a molecular weight of approximately 1000, and a 3,5-diethyl-2,4 toluenediamine. The polytetramethylene ether glycol comprises 70 to 85 weight percent of the poly component and the 3,5-diethyl-2,4 toluenediamine comprises 5 to 50 weight percent of the poly component. The cover layer has a thickness ranging from 0.010 inch to 0.025 inch and a Shore B hardness greater than 30 as measured on a golf ball and a material Shore D hardness of greater than 10 as measured on a plaque or slab. The golf ball has a coefficient of restitution greater than 0.8 and a PGA compression ranging from 50 to 125.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
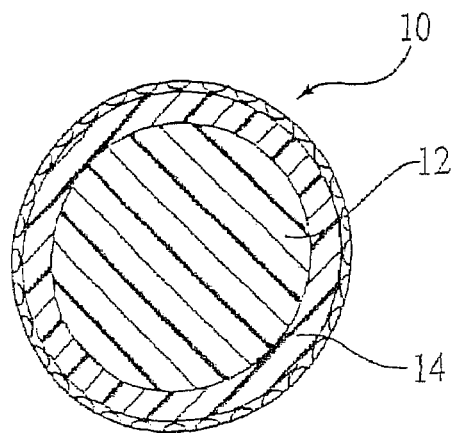
FIG. 1 shows a cross-sectional view of a golf ball having a golf ball cover formed according to the present disclosure.

Referring now to the drawings, FIG. 1 shows a golf ball having a cover comprising RIM polyurethane. The golf ball 10 includes a polybutadiene core 12 and a polyurethane cover 14 formed by RIM. The cover 14 is the product of a reaction mixture comprising an isocyanate and a polyol wherein the stoichiometry between the reactants is imbalanced.

Figure 2:
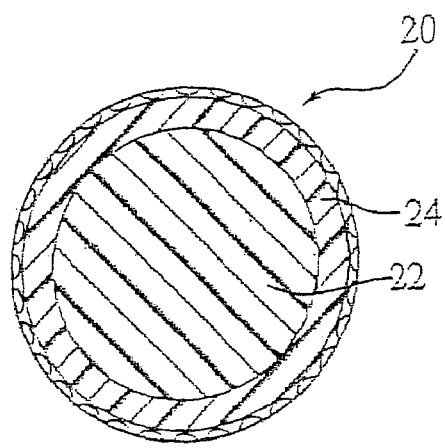
FIG. 2 shows a cross-sectional view of a golf ball having one or more golf ball components according to the present disclosure.

FIG. 2 shows a golf ball having a core comprising RIM polyurethane. The golf ball 20 has a RIM polyurethane core 22 and a RIM polyurethane cover 24. One or more of the components are formed from a reaction mixture comprising an isocyanate and a polyol wherein the stoichiometry between the reactants is imbalanced.

Figure 3:
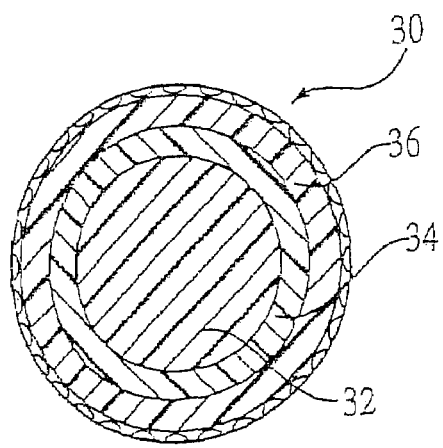
FIG. 3 shows another cross-sectional view of a golf ball having one or more golf ball components formed according to a reaction injection molding (RIM) process disclosed herein.

FIG. 3 shows a multi-layer golf ball 30 with a solid core 32 containing RIM polyurethane, a mantle or inner cover layer 34 comprising RIM polyurethane, and an outer cover layer 36. The outer cover layer 36 can also comprise RIM polyurethane. Alternatively, the inner cover layer 34 and/or the outer cover layer 36 can comprise ionomer or another conventional golf ball cover material. Such conventional golf ball cover materials typically contain titanium dioxide utilized to make the cover white in appearance.

RIM processes and materials that are useful in forming the golf ball of the present invention are disclosed in the following U.S. Patents, all of which are hereby incorporated by reference in their entireties: U.S. Pat. No. 6,290,614 for a Golf Ball Which Includes Fast-Chemical-Reaction-Produced Component And Method Of Making Same; U.S. Pat. No. 6,533,566 for an Apparatus For Making A Golf Ball; U.S. Pat. No. 6,716,954 for a Golf Ball Formed From A Polyisocyanate Copolymer And Method Of Making Same; U.S. Pat. No. 6,755,634 for an Apparatus For Forming A Golf Ball With Deep Dimples; U.S. Pat. No. 6,776,731 for an Apparatus And Process For Forming A Golf Ball With Deep Dimples; and, U.S. Pat. No. 6,790,149 for a Golf Ball.

The balls shown in FIG. 1 through FIG. 3 may be of a standard, enlarged or reduced size. Further, the core, intermediate and cover components may comprise any number of layers or sub-parts desired.

Golf balls comprising a golf ball component according to the present disclosure are also contemplated. If the component is a cover layer, then a wide array of materials may be used for the cores and mantle layer of the golf ball. For instance, the core and mantle or interior layer materials disclosed in U.S. Pat. Nos. 5,833,553, 5,830,087, 5,820,489 and 5,820,488, all of which are hereby incorporated by reference in their entirety, may be employed. If the component is a core or inner layer, then a variety of conventional materials may be used for one or more cover layers. For instance, the cover layer may employ materials such as disclosed in U.S. Pat. Nos. 6,309,314, 6,277,921, 6,220,972, 6,150,470, 6,126,559, 6,117,025, 5,902,855, 5,895,105, 5,688,869, 5,591,803, and 5,542,677, all of which are hereby incorporated by reference in their entireties.

If the component is a golf ball cover, the golf ball may be a two-piece or multi-layer ball having a wound core, a solid, non-wound core, a liquid core, or a gel core.

One or more intermediate or cover layers can be included having different characteristics. For golf balls for which feel and playability is important, it is particularly advantageous to have an outer cover Shore D hardness of 60 or less, including 50 or less. For golf balls for which lower spin rates and increased distance is important, it is particularly advantageous to have an outer cover Shore D hardness of 60 or more, including 70 or more. These measurements are made in general accordance with ASTM 2240, except they are made on the ball itself and not on a plaque. The outer layer is from about 0.005 to about 0.20 inches in thickness, including about 0.001 to about 0.100 inches in thickness. Thickness is defined as the average thickness of the non-dimpled cover of the outer cover. The outer cover is comprised of a relatively soft, low flex modulus (about 1000 psi or greater, including from about 2000 psi to about 50000 psi) material as noted above. The cover exhibits good durability characteristics (i.e., groove shear resistance of 3.5 or less, on a scale of 1 to 6 (lower numbers are better) corresponding to no loss or significant fraying of the cover material, and cut resistance of 3 or less on a scale of 1 to 5 (lower numbers are better) corresponding to a slight dent in the cover not discernible by touch). The groove shear resistance is measured on golf balls struck by a 56 degree wedge clubhead at about 103 feet per second. The cut resistance is measured on golf balls subjected to an off-center blow by a blade with an approximate 5/64" radius attached to a sled weighing approximately 6 lbs dropped from a height of about 42 inches.

The core of the golf ball can be formed of a solid, or an encapsulated sphere filled with a gas, a liquid or a gel, or any other substance that will result in a core or an inner ball (core and a at least one inner cover layer, if the ball is a multi-layer ball), having the desired COR, compression and hardness and other physical properties.

The cores of the golf ball typically have a coefficient of restitution of about 0.750 or more, more preferably 0.770 or more, and a PGA compression of about 125 or less, and more preferably 100 or less. Furthermore, in some applications it may be desirable to provide a core with a coefficient of restitution of about 0.780 to about 0.790 or more. The core used in the golf ball is preferably a solid, but any core type known in the art may be used, such as wound, liquid, hollow, metal, and the like. The term "solid cores" as used herein refers not only to one piece cores but also to those cores having a separate solid layer beneath the covers and over the central core. The cores generally have a weight of about 25 to about 40 grams and preferably about 30 to about 40 grams. Larger and heavier cores, or lighter and smaller cores, may also be used when there is no desire to meet U.S.G.A. or R. & A. standards.

When the golf ball of the present disclosure has a solid core, this core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces.

Non-limiting examples of other materials that may be used in the core composition include, but are not limited to, compatible rubbers or ionomers, and low molecular weight fatty acids such as stearic acid. Free radical initiator catalysts such as peroxides may be admixed with the core composition so that on the application of heat and pressure, a curing or cross-linking reaction takes place. The core may also be formed from any other process for molding golf ball cores known in the art.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc., on a solid, liquid, gel or gas filled center to form a thread rubber layer that is then covered with one or more mantle or cover layers. Additionally, prior to applying the cover layer(s), the thread wound core may be further treated or coated with an adhesive layer, protective layer, or any substance that may improve the integrity of the wound core during application of the cover layers and ultimately in usage as a golf ball.

The core, preferably a solid core, is about 1.2 to about 1.6 inches in diameter, although it may be possible to use cores in the range of about 1.0 to about 2.0 inches. If the ball has a single cover layer, the core size may be up to about 1.660 inches. The core 12 of the present invention is preferably a single solid core such as disclosed in U.S. Pat. No. 6,612,940, assigned to Callaway Golf Company and which pertinent parts are hereby incorporated by reference, or such as disclosed in U.S. Pat. No. 6,465,546, also assigned to Callaway Golf Company and which pertinent parts are hereby incorporated by reference. However, alternative embodiments have a non-solid or multiple cores such as disclosed in U.S. Pat. No. 6,663,509, which pertinent parts are hereby incorporated by reference.

The present disclosure includes one or more auxiliary layers disposed on the core, and a preferably immediately adjacent to the outer core surface. For example, for some applications, it may be preferred to deposit a barrier coating that limits transmission of moisture to the core. Such barrier coatings or layers are relatively thin. Generally, such coatings are at least 0.0001 inch, and preferably, at least 0.003 inch in thickness. Furthermore an adhesion promoting layer may be used between the cover layers and/or the core, or the cover and core having a barrier coating disposed thereon. Such adhesion promoting layers are known in the art and may be used in combination with the features described herein. See for example U.S. Pat. No. 5,820,488, which is hereby incorporated by reference.

The inner cover layer that is molded over the core is preferably about 0.0005 inch to about 0.15 inch in thickness. The inner ball that includes the core and inner cover layer(s), or core for a two piece ball, preferably has a diameter in the range of 1.25 to 1.67 inches. The outer cover layer is about 0.0005 inch to about 0.20 inch thick. Together, the core, the inner cover layer(s) and the outer cover layer (or core and single cover layer) combine to form a ball having a diameter of 1.680 inches or more, the minimum diameter permitted by the rules of the U.S.G.A. and weighing no more than 1.62 ounces. If desired, golf balls of different weights and diameters may also be formed if the rules of the U.S.G.A. are not an issue. In a particular embodiment of the disclosure, the golf ball has a dimple pattern that provides dimple coverage of 65% or more, preferably 75% or more, and ore preferably about 80 to 85% or more In another embodiment, there are from 250 to less than 500 dimples, preferably from about 340 to about 440 dimples. The surface geometry of the golf ball 10 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of the golf ball 10 may have a non-dimple pattern such as disclosed in U.S. Pat. No. 6,290,615 for A Golf Ball Having Tubular lattice Pattern, which pertinent parts are hereby incorporated by reference.

Specifically, the arrangement and total number of dimples are not critical and may be properly selected within ranges that are well known. For example, the dimple arrangement may be an octahedral, dodecahedral or icosahedral arrangement. The total number of dimples is generally from about 250 to about 600, and especially from about 300 to about 500. The golf balls of the present invention may comprise circular or non-circular dimples or any combination.

In a further embodiment, the golf ball typically is coated with a durable, abrasion-resistant, relatively non-yellowing finish coat or coats if necessary. The finish coat or coats may have some optical brightener and/or pigment added to improve the brightness or whiteness of the finished golf ball.

In one embodiment, from 0.001 to about 10% optical brightener may be added to one or more of the finish coatings. If desired, optical brightener may also be added to the cover materials. One type of preferred finish coatings are solvent based urethane coatings known in the art. It is also contemplated to provide a transparent outer coating or layer on the final finished golf ball.

Golf balls also typically include logos and other markings printed onto the dimpled spherical surface of the ball. Paint, typically clear paint, is applied for the purposes of protecting the cover and improving the outer appearance before the ball is completed as a commercial product. A white coating of one or two layers, typically filled with titanium dioxide of either the anatase or rutile type, may also be utilized.

Fillers are used to adjust the density, flex modulus, mold release, and/or melt flow index of a layer. With some fillers, up to about 200 parts by weight can be used. When the filler is for adjustment of density or flex modulus of a layer, it is present in an amount of at least 5 parts by weight based upon 100 parts by weight of the layer.

A density adjusting filler is used to control the moment of inertia, and thus the initial spin rate of the ball and spin decay. The addition in one or more layers, and particularly in the outer cover layer, of a filler with a lower specific gravity than the resin composition results in a decrease in moment of inertia and a higher initial spin rate than would result if no filler were used. The addition in one or more of the cover layers, and particularly in the outer cover layer, of a filler with a higher specific gravity than the resin composition, results in an increase in moment of inertia and a lower initial spin rate. High specific gravity fillers are preferred as less volume is used to achieve the desired inner or outer cover total weight. Nonreinforcing fillers are also preferred as they have minimal effect on COR. Preferably, the filler does not chemically react with the resin composition to a substantial degree, although some reaction may occur when, for example, zinc oxide is used in a shell layer which contains some ionomer. The filler usually has a specific gravity which is at least 0.05, and in specific embodiments at least 0.1, higher or lower than the specific gravity of the layer composition. In further embodiments, density adjusting fillers are used which have specific gravities which are higher or lower than the specific gravity of the resin composition by 0.2 or more or by 2.0 or more.

A flex modulus adjusting filler is a filler which, e.g. when used in an amount of 1 to 100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold and eliminates or reduces the need for external release agents which otherwise could be applied to the mold. A mold release adjusting filler typically is used in an amount of up to about 2 weight percent based upon the total weight of the layer.

A melt flow index adjusting filler is a filler which increases or decreases the melt flow, or ease of processing, of the composition.

If the component is a layer, it may contain coupling agents that increase adhesion of materials within a particular layer, e.g. to couple a filler to a resin composition, or between adjacent layers. Non-limiting examples of coupling agents include titanates, zirconates and silanes. Coupling agents typically are used in amounts of 0.1 to 2 weight percent based upon the total weight of the composition in which the coupling agent is included.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof.

Specific embodiments of the disclosure will now be described in detail. These examples are intended to be illustrative, and the disclosure is not limited to the materials, conditions, or process parameters set forth in these embodiments. All parts and percentages are by weight unless otherwise indicated.

In an alternative embodiment of a golf ball 20, the boundary layer 16 or cover layer 14 is comprised of a high acid (i.e. greater than 16 weight percent acid) ionomer resin or high acid ionomer blend. More preferably, the boundary layer 16 is comprised of a blend of two or more high acid (i.e. greater than 16 weight percent acid) ionomer resins neutralized to various extents by different metal cations.

In an alternative embodiment of a golf ball 20, the boundary layer 16 or cover layer 14 is comprised of a low acid (i.e. 16 weight percent acid or less) ionomer resin or low acid ionomer blend. Preferably, the boundary layer 16 is comprised of a blend of two or more low acid (i.e. 16 weight percent acid or less) ionomer resins neutralized to various extents by different metal cations. The boundary layer 16 compositions of the embodiments described herein may include the high acid ionomers such as those developed by E.I. DuPont de Nemours & Company under the SURLYN brand, and by Exxon Corporation under the ESCOR or IOTEK brands, or blends thereof. Examples of compositions which may be used as the boundary layer 16 herein are set forth in detail in U.S. Pat. No. 5,688,869, which is incorporated herein by reference. Of course, the boundary layer 16 high acid ionomer compositions are not limited in any way to those compositions set forth in said patent. Those compositions are incorporated herein by way of examples only.

The high acid ionomers which may be suitable for use in formulating the boundary layer 16 compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10–100%, preferably 30–70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 1006, 1007, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce boundary layer 16 compositions exhibiting enhanced hardness and resilience due to synergies which occur during processing. Consequently, these metal cation neutralized high acid ionomer resins can be blended to produce substantially higher C.O.R.'s than those produced by the low acid ionomer boundary layer 16 compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with ethylene methacrylic acid being preferred.

The softening comonomer that can be optionally included in the boundary layer 16 of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The boundary layer 16 compositions may include the low acid ionomers such as those developed and sold by E. I. DuPont de Nemours & Company under the SURLYN and by Exxon Corporation under the brands ESCOR and IOTEK, ionomers made in-situ, or blends thereof.

Another embodiment of the boundary layer 16 comprises a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which preferably have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the brand HYTREL, or thermoplastic block polyamides, for example, a polyether amide such as that marketed by Elf Atochem S. A. under the brand PEBEX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

Additional materials suitable for use in the boundary layer 16 or cover layer 14 of the present invention include polyurethanes. These are described in more detail below.

In one embodiment, the cover layer 14 is comprised of a relatively soft, low flex modulus (about 500 psi to about 50,000 psi, preferably about 1,000 psi to about 25,000 psi, and more preferably about 5,000 psi to about 20,000 psi) material or blend of materials. Preferably, the cover layer 14 comprises a polyurethane, a polyurea, a blend of two or more polyurethanes/polyureas, or a blend of one or more ionomers or one or more non-ionomeric thermoplastic materials with a polyurethane/polyurea, preferably a thermoplastic polyurethane or reaction injection molded polyurethane/polyurea (described in more detail below).

The cover layer 14 preferably has a thickness in the range of 0.005 inch to about 0.15 inch, more preferably about 0.010 inch to about 0.050 inch, and most preferably 0.015 inch to 0.025 inch. In one embodiment, the cover layer 14 has a Shore B hardness of 90 or less, and more preferably 80 or less. In another preferred embodiment, the cover layer 14 is comparatively harder than the boundary layer 16.

The cover layer 14 preferably comprises a polyurethane/polyurea with a Shore D hardness (plaque) of from about 10 to about 55 (Shore B of about 32 to about 84), more preferably from about 25 to about 55 (Shore B of about 62 to about 84), and most preferably from about 30 to about 55 (Shore B of about 66 to about 84) for a soft cover layer 14 and from about 20 to about 90, preferably about 30 to about 80, and more preferably about 40 to about 70 for a hard cover layer 14.

The polyurethane preferably has a flex modulus from about 1 to about 310 Kpsi, more preferably from about 3 to about 100 Kpsi, and most preferably from about 3 to about 40 Kpsi for a soft cover layer 14 and 40 to 90 Kpsi for a hard cover layer 14.

A preferred quasi-prepolymer of the isocyanate component is ISONATE 181 prepolymer available from Dow Plastics (Mondur PF from Bayer may also be used). ISONATE 181 is a diphenylmethane diisocyanate with glycol (typically diethylene glycol). ISONATE has a nitrogen-oxygen-carbon ("NCO") group content of approximately 23.

A preferred diethyl-2,4-toluene-diamine is available from Albemarle Corporation of Baton Rouge, La. under the tradename ETHACURE® 100 or EHTACURE® 100 LC.

A preferred pigment material is PLASTICOLORS DR-10368.

A preferred polytetramethylene ether glycol of the poly component is TERATHANE® 1000 polyether glycol from DuPont Chemical (PolyTHF 1000 and 2000 from BASF may also be used). TERATHANE® 1000 polyether glycol is a polytetramethylene ether glycol which has a molecular weight of approximately 1000. Another preferred polytetramethylene ether glycol of the poly component is TERATHANE® 2000 polyether glycol from DuPont Chemical. TERATHANE® 2000 polyether glycol is a polytetramethylene ether glycol which has a molecular weight of approximately 2000. Both TERATHANE® 1000 and TERATHANE® 2000 have the chemical structure set forth below, with n averaging 14 for TERATHANE® 1000, and n averaging 27 for TERATHANE® 2000.

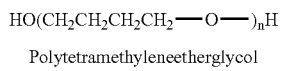

Polytetramethyleneetherglycol

TABLE ONE

| MATERIAL | Example A | Example B | Example C |
|---|---|---|---|
| Terathane 1000 | 100.00 | 75.00 | 25.00 |
| Terathane 2000 |  | 25.00 | 75.00 |
| Ethacure 100LC | 25.00 | 25.00 | 25.00 |
| Dabco T-12 | 0.10 | 0.10 | 0.10 |
| Dabco 33 LV | 0.10 | 0.10 | 0.10 |
| Plasticolors DR-10368 | 4.35 | 4.25 | 4.06 |

TABLE ONE-continued

| MATERIAL | Example A | Example B | Example C |
|---|---|---|---|
| Isonate 181 | 133.18 | 126.23 | 120.00 |
| TOTALS | 320.99 | 313.94 | 319.97 |

TABLE TWO

| Material | Example A | Example B | Example C | VibraRIM 813 |
|---|---|---|---|---|
| Size (in) | 1.641 (.0073) | 1.641 (.0006) |  | 1.641 (.0073) |
| Weight (g) | 42.41 (.11) | 42.69 (.04) |  | 42.41 (.11) |
| Instron | .1010 (.0037) | .097 (.0021) |  | .1010 (.0037) |
| Top Flite PGA | 74 | 79 |  | 74 |
| Callaway PGA | 82 | 88 |  | 82 |
| CoR | .8110 (.0014) | .811 (.0019) |  | .8110 (.0014) |

TABLE THREE

| Material | Example A | Example B | Example C | VibraRIM 813 | HX TOUR cast material |
|---|---|---|---|---|---|
| Size (in) | 1.681 (.0005) | 1.681 (.0004) | 1.684 (.0007) | 1.684 (.0006) | 1.681 (.0006) |
| Weight (g) | 45.47 (.093) | 45.46 (.04) | 45.63 (.06) | 45.70 (.063) | 45.43 (.079) |
| Instrom | 0.095 (.0007) | .0945 (.0032) | .0928 (.0048) | .095 (.0006) | .088 (.002) |
| Top Flite PGA | 81 | 82 | 83 | 81 | 89 |
| Callaway PGA | 91 | 92 | 94 | 91 | 101 |
| CoR | 0.804 | 0.804 | 0.810 | 0.800 | 0.801 |
| NezFactor | 899 | 899 | 903 | 895 | 889 |

TABLE FOUR

| Material | Example A | Example B | Example C | VibraRIM 813 | HX Tour cast cover |
|---|---|---|---|---|---|
| HS Driver (deg, fps, RPM) | 9.9, 260.5, 2495 | 10.2, 260.0, 2418 |  | 9.7, 259.7, 2706 | 9.6, 261.6, 2626 |
| PRO Driver (deg, fps, RPM) | 9.8, 240.0, 2948 | 10.1, 240.0, 2536 |  | 9.7, 238.9, 2979 | 9.7, 240.4, 3010 |
| AM Driver (deg, fps, RPM) | 12.5, 200.5, 3210 | 12.6, 200.8, 2906 |  | 12.4, 199.9, 3448 | 12.4, 200.8, 3455 |
| 5-Iron (deg, fps, RPM) | 13.9, 189.8, 5496 | 14.6, 190.4, 5311 |  | 13.9, 189.3, 5599 | 13.9, 189.3, 5689 |
| PW (deg, fps, RPM) | 27.3, 139.0, 7791 |  |  | 25.7, 140.2, 9621 | 25.6, 139.8, 9738 |
| 76 fps Chip (deg, fps, RPM) | 31.6, 77.2, 6460 |  |  | 29.1, 78.1, 7204 | 29.1, 78.0, 7210 |
| 60 fps Chip (deg, fps, RPM) | 28.0, 60.8, 4815 | 28.6, 63.3, 4812 |  | 25.9, 61.1, 5570 | 26.0, 60.7, 5344 |

TABLE FIVE

| Material | Example A | Example B | Example C | VibraRIM 813 | HX Tour cast cover |
|---|---|---|---|---|---|
| Scuff (Median values) | 1.75 | 2.00 | 2.25 | 2.25 | 2.00 |
| Cut** | 2.0 | 2.0 | 3.0 | 2.0 | 2.0 |
| Shore B (Median values) | 91.0 | 95.0 | 95.0 | 86.0 | 89.0 |
| Shore D (Median values) | 65.0 | 64.0 | 65.0 | 60.0 | 63.0 |
| Weatherometer | Pass | Not Tested | Not Tested | Pass | Pass |
| Cold Crack @-23 F. (6 each to 5 blows) | 3@ 2 blows, 2@ 5 blows | Not Tested | Not Tested | No Failures | No Failures |
| Cold Crack @-12 F. (6 each to 5 blows) | No Failures | No Failures | No Failures | No Failures | No Failures |
| Barrel (12 each to 500 blows) | 1@ 434, 474, 500 | 1@ 224, 226, 226, 226, 278, 298, 298, 300, 313, 391, 429, 487 | No failures | No Failures | 1@ 492 |
| High Speed (12 each to 200 blows) | 1@ 85, 106, 107, 112, 117, 118, 121, 127, 132, 136, 148, 160 | 1@ 159, 159, 164, 169, 169, 170, 172, 185, 185, 176, 187, 191, 194, 197, 200, 3 survived | 1@ 177, 180, 199, 9 survived | 1@ 73, 74, 79, 97, 97, 117, 122, 127, 131, 160, 200, 2 survived | 1@ 102, 104, 118, 122, 132, 140, 145, 146, 171, 184, 2 survived |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball comprising:
    a layer comprising a polyurethane/polyurea material, the polyurethane/polyurea material formed from reaction injection molding a polyol component and an isocyanate component, the polyol component comprising polytetramethylene ether glycol and a 3,5-diethyl-2,4 toluenediamine, the isocyanate component comprising a quasi-polyurethane prepolymer comprising methylene-4,4'-diphenyldiisocyanate and a glycol, wherein the polyol component comprises 55 to 70 weight percent of the polyurethane/polyurea material and the isocyanate component comprises 30 to 45 weight percent of the polyurethane/polyurea material and having a free isocyanate content of greater than 15 weight percent of the isocyanate component;
    wherein the layer is selected from the group consisting of core, boundary layer and cover layer.

2. The golf ball according to claim 1 wherein the layer is a cover layer having a thickness ranging from 0.010 inch to 0.025 inch and a Shore B hardness greater than 30 as measured on a golf ball and a material Shore D hardness of greater than 10 as measured on a plaque or slab.

3. The golf ball according to claim 1 wherein the layer is a boundary layer having a thickness ranging from 0.010 inch to 0.050 inch and a Shore D hardness greater than 60.

4. The golf ball according to claim 1 wherein the layer is a core having a diameter ranging from 1.45 inches to 1.65 inches.

5. The golf ball according to claim 1 wherein the polyol component comprises 58 to 65 weight percent of the polyurethane/polyurea material and the isocyanate component comprises 35 to 42 weight percent of the polyurethane/polyurea material.

6. A golf ball comprising:
    a layer comprising a polyurethane/polyurea material, the polyurethane/polyurea material formed from reaction injection molding a polyol component and an isocyanate component, the polyol component comprising a first polytetramethylene ether glycol having a molecular weight of approximately 1000, a second polytetramethylene ether glycol having a molecular weight of approximately 2000 and a 3,5-diethyl-2,4 toluenediamine, the isocyanate component comprising a quasi-polyurethane prepolymer comprising methylene-4,4'-diphenyldiisocyanate and a glycol and having a free isocyanate content of greater than 15 weight percent of the isocyanate component, wherein the polyol component comprises 55 to 70 weight percent of the polyurethane/polyurea material and the isocyanate component comprises 30 to 45 weight percent of the polyurethane/polyurea material;
    wherein the layer is selected from the group consisting of core, boundary layer and cover layer.

7. The golf ball according to claim 6 wherein the first polytetramethylene ether glycol comprises 50 to 70 weight percent of the polyol component, the second polytetramethylene ether glycol comprises 10 to 30 weight percent of the polyol component, and the 3,5-diethyl-2,4 toluenediamine comprises 10 to 30 weight percent of the polyol component.

8. The golf ball according to claim 6 wherein the first polytetramethylene ether glycol comprises 55 to 65 weight percent of the polyol component, the second polytetramethylene ether glycol comprises 15 to 25 weight percent of the polyol component, and the 3,5-diethyl-2,4 toluenediamine comprises 15 to 25 weight percent of the polyol component.

9. The golf ball according to claim 6 wherein the first polytetramethylene ether glycol comprises 55 to 60 weight percent of the polyol component, the second polytetramethylene ether glycol comprises 15 to 20 weight percent of the polyol component, and the 3,5-diethyl-2,4 toluenediamine comprises 15 to 20 weight percent of the polyol component.

10. The golf ball according to claim 6 wherein the polyol component further comprises a pigment material in an amount of 2 to 5 weight percent of the polyol component.

11. A golf ball comprising:
    a core;
    a boundary layer disposed over the core;
    a cover layer disposed over the boundary layer, the cover layer comprising a polyurethane/polyurea material, the polyurethane/polyurea material formed from reaction injection molding a polyol component and an isocyanate component, the polyol component comprising a first polytetramethylene ether glycol having a molecular weight of approximately 1000, a second polytetramethylene ether glycol having a molecular weight of approximately 2000 and a 3,5-diethyl-2,4 toluenediamine, wherein the first polytetramethylene ether glycol comprises 55 to 60 weight percent of the polyol component, the second polytetramethylene ether glycol comprises 15 to 20 weight percent of the polyol component, and the 3,5-diethyl-2,4 toluenediamine comprises 15 to 20 weight percent of the polyol component;
    wherein the cover layer has a thickness ranging from 0.010 inch to 0.025 inch and a Shore B hardness greater than 30 as measured on a golf ball and a material Shore D hardness of greater than 10 as measured on a plaque or slab.

12. The golf ball according to claim 11 wherein the isocyanate component comprises a quasi-polyurethane prepolymer comprising methylene-4,4'-diphenyldiisocyanate and a glycol and the isocyanate component has a free isocyanate content of greater than 15 weight percent of the isocyanate component.

13. The golf ball according to claim 11 wherein the boundary is composed of an ionomer material and has a thickness ranging from 0.045 inch to 0.075 inch.

* * * * *